Jan. 28, 1958 J. W. FISK 2,821,046
COMBINATION BAIT HOLDER AND SINKER
Filed June 6, 1955
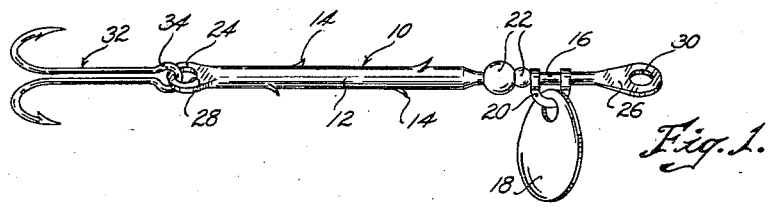
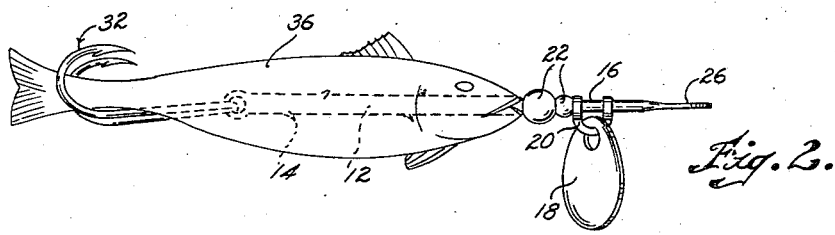
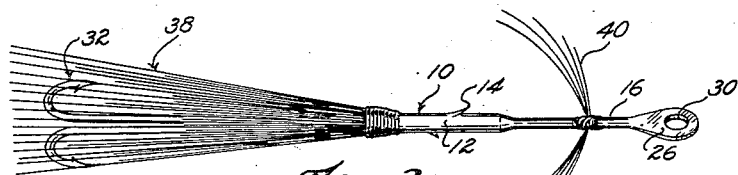
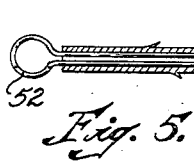
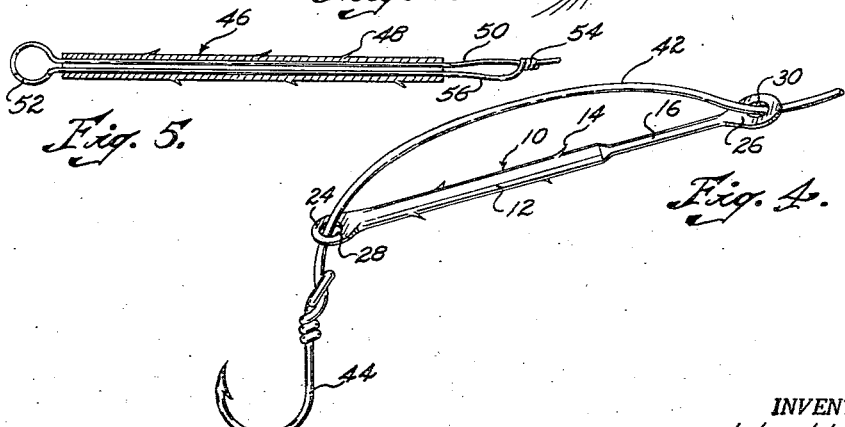
INVENTOR.
John W. Fisk
BY
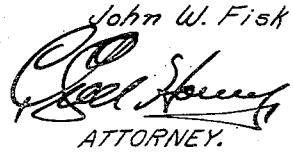
ATTORNEY.

2,821,046

COMBINATION BAIT HOLDER AND SINKER

John W. Fisk, Independence, Mo.

Application June 6, 1955, Serial No. 513,289

1 Claim. (Cl. 43—44.2)

This invention relates to improvements in fishing equipment and particularly to a device especially adaptable to facilitate the mounting of bait, either real or artificial, in association with a hook, the primary object being to combine in a device of such character, features for adapting the same to function in a manner to also eliminate the need of a sinker.

It is the most important object of the present invention to provide a combination bait holder and sinker in the nature of an elongated, rigid element that is externally pronged or barbed so that when the bait is placed thereon, it will not only be held in a life-like extended position, but will be maintained in a proper relationship to the hook.

Another object of the present invention is to provide fishing tackle of the aforementioned character wherein is provided, eyelets at the opposite ends thereof for receiving the line as well as the hook, all in a manner to facilitate mounting of the bait thereon.

Other objects include the way in which the aforementioned device is adapted to serve as a form or base support for various types of bait, either real or artificial; the manner in which the device is adapted to be used either by fly fishermen in casting operations, trolling or pole fishing with merely a hook and a float; and many more minor objects to become apparent as the following specification progresses.

In the drawing:

Figure 1 is a perspective view of a combination bait holder and sinker, made according to my invention.

Fig. 2 is an elevational view thereof, showing one form of bait mounted thereon.

Fig. 3 is a view similar to Fig. 1, illustrating one way in which the same may be formed into an artificial lure.

Fig. 4 is a perspective view illustrating another manner of use of the device; and Fig. 5 is a longtiudinal, cross-sectional view through a modified combination bait holder and sinker, made according to the present invention.

The device shown in Figs. 1 to 4, inclusive of the drawing, consists essentially of an elongated, relatively rigid member, broadly designated by the numeral 10, having a length 12 that is sliced at various points thereon to provide a plurality of relatively sharp barbs or prongs 14.

Another length 16 of the member 10 is preferably smooth and circular in transverse cross section, whereby the device may be utilized, if desired, to mount a spinner plate 18 through the medium of a conventional clevis 20, which in turn may ride against a plurality of beads 22, serving as bearings and disposed between the clevis 20 and the barbed portion 12 of the shank-like member 10.

Member 10 is provided with flattened ends 24 and 26 that are in turn provided with perforations 28 and 30, respectively. Manifestly any suitable type of hook may be utilized, but in the embodiment chosen for illustration, there is shown a hook cluster 32, having separate shanks that are connected by an eye 34, adapted to be removably hooped into the perforation or eyelet 28, at the outermost end of the shank portion 12.

Fig. 2 of the drawing illustrates the way in which the device may be employed to receive live bait 36. It is but necessary to first remove the hooks 32 from the eyelet 28 and thereupon thread the bait 36 upon the shank portion 12 until the eyelet 28 protrudes so that the hooks 32 may again be fastened into place on the member 10. Thereupon the bait 36 may be shifted to a position covering a substantial portion of the shanks of the hooks 32.

It is seen that during casting or while the bait 36 is trolled through the water it will not have the tendency to either spin around the barbed portion 12 or to "bunch up" around the hooks 32 as is commonly true of conventional bait-receiving devices. The prongs 14 prevent such slippage of the bait 36, relative to the length 12 of member 10.

It is manifest also that through use of a bait holder of this character it is unnecessary to utilize additional sinkers since the weight of the member 10 is quite adequate to maintain the bait 36 at the desired depth beneath the surface of the water. It is important also to note that by use of an elongated member such as at 10 which extends longitudinally of the bait 36, substantially all of the lure is hidden from view, and when a leader is tied in perforation or eyelet 30 the overall lure simulates natural prey, and it is unnecessary for the fisherman to continually adjust the bait after a large number of casting operations or continuous trolling over a long period of time.

In Fig. 3 of the drawing there is illustrated an artificial lure made from the member 10 and which may consist of a bucktail 38 or any other type of artificial material tied directly to the shank portion 12 in the conventional manner and in covering relationship to the hooks 32 as well as a portion of the device 10. In this instance the shank portion 16 may likewise be employed to mount fly material 40 of any chosen characteristic.

Fig. 4 of the drawing illustrates still another way in which the device 10 may be employed if desired. In the instance the fishing line 42 is merely threaded through the eyelets 30 and 28 and hook 44 tied thereto. In this instance, the device 10 serves merely as a sinker but may be covered with bait in substantially the same manner as illustrated in Fig. 2 if desired.

Fig. 5 of the drawing illustrates a modified form of the invention wherein the elongated member 46 is tubular and provided with external barbs or prongs 48 for the same purposes as above outlined. The eyelets for the combination bait holder and sinker, shown in Fig. 5, are formed by threading a small, relatively thin wire 50 through the member 46 longitudinally thereof, rebending the wire 50 at one end of the member 46 to provide a loop or eyelet 52, and thereupon wrapping the end of the wire 50, as at 54, to present a second loop or eyelet 54 at the opposite end of the member 46. In all other respects the device as shown in Fig. 5 may be employed in a large number of ways as above described with respect to the embodiment of Figures 1 to 4, inclusive, and in various other fashions as may be desired by the fisherman.

Having thus described the invention, what is claimed as new and desired to be secured by Letters Patent is:

A combination bait holder and sinker comprising an elongated, unitary member of a single length of unbent, rigid material and having first and second elongated, cylindrical portions, said second portion being smooth surfaced, coaxial and integral with the first portion, having a diameter approximately half that of the first portion and appreciably shorter than the latter, said member having a frusto-conical intermediate portion at the zone of merger between said first and second portions, opposed, outermost segments of each of the sections being flattened to present relatively thin, planar ends lying in a common plane and having arcuate peripheral edges, each of said ends being provided with a perforation to present an eyelet at each end of the member, said first portion having a plurality of radially extending, relatively sharp, pointed barbs integral therewith, spaced at intervals both longitudinally and circumferentially throughout the length of said first portion and all canted in the direction of said second portion, said first portion and the eyelet thereof being adapted to be pushed into the bait and said first portion being of sufficient weight to maintain the bait below the surface of the water; a number of beads rotatably mounted on the second portion adjacent the intermediate portion; and a spinner rotatably mounted on said second portion between the beads and the eyelet thereof.

References Cited in the file of this patent

UNITED STATES PATENTS

| | | |
|---|---|---|
| 531,140 | Stapp | Dec. 18, 1894 |
| 1,717,376 | Ellerbroke | June 18, 1929 |
| 1,869,305 | Dockman | July 26, 1932 |
| 2,562,605 | Embree et al. | July 31, 1951 |
| 2,611,984 | Gautsche | Sept. 30, 1952 |

FOREIGN PATENTS

| | | |
|---|---|---|
| 977,212 | France | Nov. 8, 1950 |
| 977,279 | France | Nov. 8, 1950 |
| 994,420 | France | Aug. 8, 1951 |